FUEL SYSTEM FOR GAS TURBINE ENGINES

Filed April 27, 1967 3 Sheets-Sheet 1

Inventors
CHRISTOPHER LINLEY JOHNSON
DAVID OMRI DAVIES
HOWARD GEORGE HARTLAND
KEITH ANTHONY HATCHETT
By Cushman, Darby & Cushman
Attorneys

FUEL SYSTEM FOR GAS TURBINE ENGINES

Filed April 27, 1967 3 Sheets-Sheet 2

Inventors
CHRISTOPHER LINLEY JOHNSON
DAVID OMRI DAVIES
HOWARD GEORGE HARTLAND
KEITH ANTHONY HATCHETT
By Cushman Darby & Cushman
Attorneys

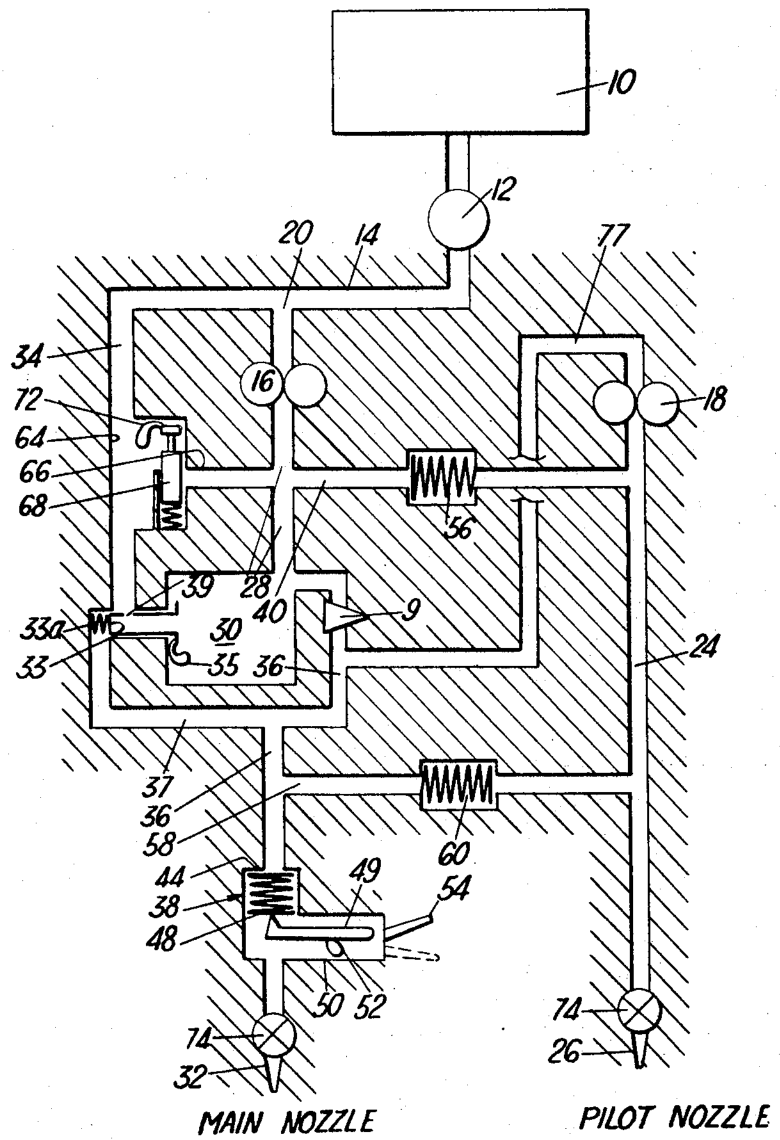
Inventors
CHRISTOPHER LINLEY JOHNSON
DAVID OMRI DAVIES
HOWARD GEORGE HARTLAND
KEITH ANTHONY HATCHETT
By Cushman, Darby & Cushman
Attorneys United States Patent Office 3,391,534

Patented July 9, 1968

3,391,534

FUEL SYSTEM FOR GAS TURBINE ENGINES

Christopher Linley Johnson, David Omri Davies, Howard George Hartland, and Keith Anthony Hatchett, Derby, England, assignors to Rolls-Royce Limited, Derby, England, a British company Continuation-in-part of application Ser. No. 445,040, Apr. 2, 1965. This application Apr. 27, 1967, Ser. No. 634,237

Claims priority, application Great Britain, May 7, 1964, 18,987/64

8 Claims. (Cl. 60—39.28)

ABSTRACT OF THE DISCLOSURE

The invention concerns a jet engine fuel system for supplying main and pilot burners, the system having a fuel reservoir, main and pilot fuel conduits, main and pilot fixed displacement fuel pumps. A fuel control unit is provided downstream of the main fuel pump and incorporates a spill valve for returning fuel to the inlet of one of the pumps. The main and pilot fuel lines are interconnected downstream of the control unit and a pressure limiting valve permits or prevents fuel flow from the pilot line to the main line according to the fuel pressure difference therebetween.

Figure 1:
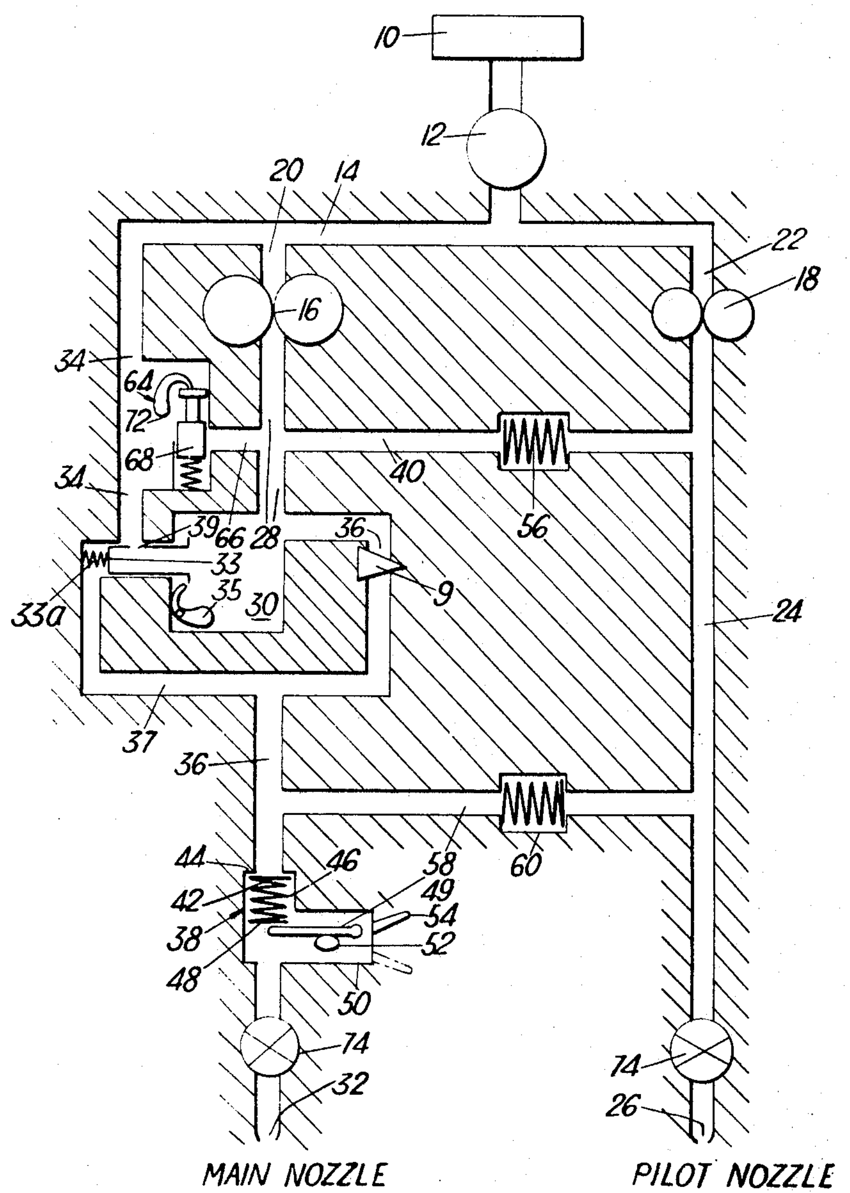

This invention, which relates to a gas turbine engine fuel system, is a continuation-in-part of our application Ser. No. 445,040, filed Apr. 2, 1965, now abandoned.

According to one aspect of the present invention there is provided a gas turbine engine fuel system comprising a fuel reservoir, first and second conduits each of which is arranged to receive fuel which has come from the fuel reservoir and which respectively extend to main and pilot burners of a fuel injector, first and second fixed displacement fuel pumps connected respectively in said first and second conduits, a fuel control unit which is connected in said first conduit downstream of said first pump and which is arranged to meter fuel in dependence upon at least one engine variable, the fuel control unit incorporating spill means for returning to the inlet of at least one of said pumps spill fuel which is in excess of engine requirements.

Throughout the specification and the claims, any reference to the upstream or downstream side of the fuel control unit should be interpreted as describing the main flow of fuel from the pump to the main burner without regard for the separate flows which take place when fuel is dumped out of the main stream.

According to another aspect of the present invention there is provided a gas turbine engine fuel system comprising a fuel reservoir, a fuel injector having main and pilot burners, first and second conduits each of which is arranged to receive fuel which has come from the fuel reservoir and which respectively extend to the main and pilot burners, first and second fixed displacement fuel pumps connected respectively in said first and second conduits, a fuel control unit which is connected in said first conduit downstream of said first pump and which is arranged to meter fuel in dependence upon at least one engine variable, the fuel control unit incorporating spill means for returning to the inlet of at least one of said pumps spill fuel which is in excess of engine requirements, and a connecting passage extending between the first and second conduits downstream of the fuel control unit, and a pressure limiting valve connected in said connecting passage, the pressure limiting valve permitting fuel to flow from the second conduit to the first conduit when the pressure difference of the fuel therebetween exceeds a predetermined value.

The first and second pumps are preferably gear pumps.

Preferably the said spill means returns fuel directly and preferentially to the inlet of the second pump. Alternatively, the said spill means may return fuel to the inlets of both the first and second pumps.

The spill means may comprise a spill valve whose position depends upon the pressure drop across the fuel control unit, the position of the spill valve determining the amount of spill flow.

A connecting conduit may be provided for connecting the outlets of the first and second pumps upstream of the fuel control unit, the connecting conduit having a non-return valve therein to permit fuel to flow only from the outlet of the first pump to the outlet of the second pump.

Speed sensitive means may be provided in the first conduit for passing fuel from the outlet of the first pump to the said inlet thereof when a predetermined engine speed has been reached.

The said pumps may be arranged in parallel. Alternatively, the arrangement may be such that the second conduit does not receive fuel directly from the fuel reservoir but receives its fuel from the first conduit, the first and second pumps being arranged in series. Thus the second conduit may communicate with the first conduit on the downstream side of the fuel control unit.

Figure 2:
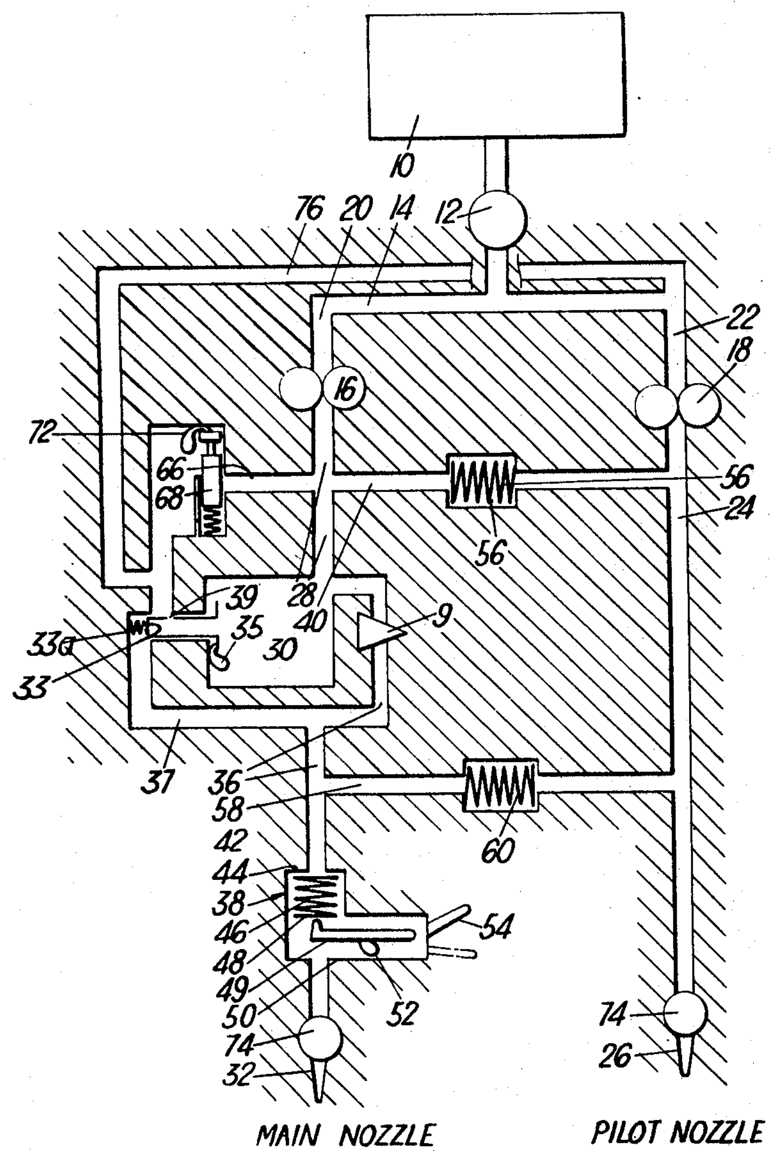

The invention is illustrated, merely by way of example, in the accompanying drawings, in which:

FIGURE 1 is a diagrammatic view of a fuel system in accordance with the invention, and FIGURES 2 and 3 respectively show modifications of the fuel system of FIGURE 1.

Referring first to FIGURE 1, 10 indicates a reservoir of fuel which is connected to the inlet or low pressure side of a backing pump 12, which may be either a gear pump or a centrifugal pump.

The delivery or high pressure side of the pump 12 is connected to a conduit 14 which is itself connected to the inlet or low pressure side of a fixed displacement main pump 16 and a fixed displacement pilot pump 18 through conduits 20 and 22 respectively. The pumps 16, 18 are thus arranged in parallel.

A conduit 24 is connected between the high pressure side or outlet of the pump 18 and a pilot burner 26 whereby fuel can be injected into the combustion chamber of a gas turbine engine, not shown.

The delivery or high pressure side of the main pump 16 is connected to one end of a conduit 28, the other end of which is connected to the inlet of a fuel control unit 30 which is adapted to meter the flow of fuel to a main burner or burners 32 of the engine in accordance with one or more engine variables. The fuel control unit 30 is provided with a variable metering orifice 9.

Fuel in excess of engine fuel requirements which is passed to the fuel control unit 30 by the main pump 16 is spilled back directly to the inlet or low pressure side of the pumps 16 and 18 via the interior of an axially slidable spill valve sleeve 33. The sleeve 33, which forms part of the fuel control unit 30, has an aperture 39 therein which communicates with a conduit 34, the extent of communication between the aperture 39 and conduit 34 depending upon the aixal position of the sleeve 33. The part of the fuel which is to be injected into the combustion chamber passes to the main burner 32 through a conduit 36.

The sleeve 33 is closed at its left hand end as viewed in FIGURE 1, the right hand face of the closed end being subjected to the delivery pressure of the pump 16, whilst the left hand face thereof is subjected via a conduit 37 to the metered pressure of the fuel after the latter has passed through the fuel control unit 30. The sleeve 33 is acted on by a tension spring 33*a* which tends to draw the sleeve 33 in the sense of spilling more fuel into the conduit 34. Axial movement of the sleeve 33 is also effected by centrifugal governor weights 35 which are rotated by the engine (by means not shown).

Thus the quantity of fuel spilled back to the inlet of the main pump 16 will be dictated by the position of the sleeve 33 relative to the conduit 34, which position will in turn be dictated by the pressure drop across the fuel control unit 30 and by axial movements caused by the weights 35 and any other selected engine variable.

Valve means 38 are interposed in the conduit 36 between the fuel control unit 30 and the main burner 32 to enable, when so desired, all the fuel pumped by the pumps 16 and 18 to be delivered to the pilot burner 26 via a connecting conduit 40, the connecting conduit 40 connecting the outlets of the pumps 16, 18 upstream of the fuel control unit 30.

As can be seen from FIGURE 1, the valve means 38 comprise a valve member 42 which is resiliently urged towards a valve seat 44 by means of a spring 46. The spring 46 is carried on a support 48 attached to one end of an arm 49 which is pivotally connected to a valve casing 50.

The arm 49 can be turned about its pivot by means of a cam 52. The cam 52 is pivotally mounted on the valve casing 50, an arm 54 being connected to the cam 52.

Thus when it is desired to direct all the fuel from the main pump 16 to the pilot burner 26, for example during start-up of a gas turbine engine employing a fuel system in accordance with the invention, the arm 54 is turned in a clockwise direction to the broken line position shown in FIGURE 1. The cam 52 then turns the arm 49 in a clockwise direction whereby the valve member 42 is pushed against the valve seat 44. The valve means 38 will then prevent fuel which has passed through the fuel control unit 30 from passing to the main burner 32, whereby there will be no pressure drop across the fuel control unit 30.

Since there is no pressure drop across the fuel control unit 30 the sleeve 33 will be moved to a position in which fuel cannot be returned to the inlet of the main pump 16 via aperture 39 and the conduit 34, whereby the fuel delivered by the main pump 16 will pass to the pilot burner 26 via the conduits 40 and 24.

However, when the pressure of the fuel delivered by the main pump 16 exceeds a predetermined figure, the spring 46 is overcome and the valve member 42 moves off the valve seat 44 to allow fuel to flow to the main burner 32, whereby a pressure drop is created across the fuel control unit 30.

A non-return valve 56 is interposed in the connecting conduit 40 to ensure that whilst fuel can flow from the outlet of the main pump 16 to the outlet of the pilot pump 18 and so to the pilot burner 26, fuel cannot flow from the outlet of the pilot pump 18 to the outlet of the main pump 16.

The conduits 36 and 24 are also interconnected by a connecting passage 58 which is connected to the conduit 36 downstream of the fuel control unit 30. A pressure limiting valve 60 is interposed in the conduit 58 so that if excessive fuel pressures build up in the conduit 24 the fuel can pass to the conduit 36. The pressure limiting valve 60 is, however, a non-return valve which prevents fuel from flowing from the conduit 36 to the conduit 24.

An emergency governor 64 is interposed in a conduit 66 connected between the conduits 34 and 28 and comprises an axially movable valve member 68 spring urged into a position to prevent fuel flowing from the outlet of the main pump 16 to its inlet, whilst centrifugal governor weights 72 rotated by the engine by means not shown are arranged to move the valve member 68 axially to permit fuel to flow from the outlet to the inlet of the main pump 16.

Thus when a predetermined engine speed is attained the governor weights 72 move the valve member 68 off its seat and permit some of the fuel delivered by the main pump 16 to be returned to the inlet or low pressure side thereof thereby reducing the fuel flow to the main burner 32 and thus reducing the speed of the engine.

The pumps 16 and 18 are preferably gear pumps.

If desired, the emergency governor 64 may be connected between the conduits 34 and 36 downstream of the fuel control unit 30.

A shut-off cock 74 is interposed in each conduit 36, 24 upstream of the main and pilot burners, and is adapted to permit or prevent fuel flow to the burners. The shut-off cocks 74 are interconnected, by means not shown, so that they open and close simultaneously.

The valve means 38 may be interposed in the conduit 36 upstream of the junction of the latter with the conduit 58, whereby if excessive pressures build up in the conduit 24, fuel can pass to the conduit 36 from the conduit 24 and enter the combustion chamber through the main burner 32.

Alternatively, the valve means 38 may be interposed in the conduit 28 between the outlet of the main pump 16 and the fuel control unit 30, whereby if excessive pressures build up in the conduit 24, fuel can pass to the conduit 36 via the pressure limiting valve 60 and enter the combustion chamber through the main burner 32.

The fuel system of FIGURE 1 has been designed to replace the hitherto used variable displacement pumps, which are costly, complicated and required heavy control equipment, with constant displacement pumps which are relatively simple, cheap and light. However, constant (or fixed) displacement pumps cause temperature problems since such pumps continuously pass more fuel than is required under certain operational conditions. In addition, the passing of heated fuel through the fuel control unit gives rise to sealing problems and to an increased tendency to corrosion. Such heated fuel has, moreover, an adverse effect on the performance of the pumps by affecting the mass flow of fuel due to changed fuel density at the higher temperatures.

The system of FIGURE 1, however, tends to reduce the temperature rise which would otherwise occur, particularly at low fuel flows, in a system using gear pumps, by reducing the pressure rise required of the main pump 16.

In FIGURES 2 and 3 there are shown fuel systems which are generally similar to that of FIGURE 1 and which for this reason will not be described in detail, similar reference numerals being used to indicate similar parts.

In the FIGURE 2 construction, however, a conduit 76 is provided which is the only spill flow conduit and which communicates with conduit 14, delivering spill fuel preferentially to the inlet of the pilot pump 18. The arrangement is thus such that although some spill fuel is supplied to the inlets of both the pumps 16, 18, very considerably more is supplied to pilot pump 18 than to main pump 16. This ensures that the minimum quantity of heated fuel is recirculated in the main fuel system.

In the FIGURE 3 construction, the inlet of the pilot pump 18 does not, as in the FIGURE 1 construction, receive its fuel directly from the backing pump 12 of the fuel reservoir 10, but receives fuel which has been pumped through the main pump 16. That is to say, the pumps 16, 18 are in series, some of the fuel which has passed through the fuel control unit 30 passing to the inlet of the pilot pump 18 via a conduit 77. This arrangement has the advantage that the calibration of the fuel system does not depend upon the capacity of the pilot pump 18 and upon the consequent effects of fuel density on mass flow.

What we claim is:

1. A gas turbine engine fuel system comprising a fuel reservoir, a fuel injector having main and pilot burners, first and second conduits each of which is arranged to receive fuel which has come from the fuel reservoir and which respectively extend to the main and pilot burners, first and second fixed displacement fuel pumps connected respectively in said first and second conduits, a fuel control unit which is connected in said first conduit downstream of said first pump and which is arranged to meter fuel in dependence upon at least one engine variable, the fuel control unit incorporating spill means for returning to the inlet of at least one of said pumps spill fuel which is in excess of engine requirements, and a connecting passage extending between the first and second conduits downstream of the fuel control unit, and a pressure limiting valve connected in said connecting passage, the pressure limiting valve permitting fuel to flow from the second conduit to the first conduit when the pressure difference of the fuel therebetween exceeds a predetermined value.

2. A fuel system as claimed in claim 1 in which the said spill means returns fuel directly to the inlet of the second pump.

3. A fuel system as claimed in claim 1 in which the said spill means returns fuel to the inlets of both the first and second pumps.

4. A fuel system as claimed in claim 1 in which the spill means comprises a spill valve whose position depends upon the pressure drop across the fuel control unit, the position of the spill valve determining the amount of spill flow.

5. A fuel system as claimed in claim 1 wherein there is provided a connecting conduit for connecting the outlets of the first and second pumps, which conduit is located between the fuel control unit and the said pumps, and a non-return valve in said connecting conduit to permit fuel to flow only from the outlet of the first pump to the outlet of the second pump.

6. A fuel system as claimed in claim 1 wherein said first conduit is provided with speed sensitive means for passing fuel from the outlet of the first pump to the inlet thereof when a predetermined engine speed has been reached.

7. A fuel system as claimed in claim 1 wherein the second conduit is adapted to receive fuel from the first conduit, and the said first and second fixed displacement fuel pumps are arranged in series.

8. A fuel system as claimed in claim 7 in which the second conduit communicates with the first conduit on the downstream side of the fuel control unit.

References Cited

UNITED STATES PATENTS

| | | | |
|---|---|---|---|
| 2,633,830 | 4/1953 | McCourty et al. | |
| 2,725,932 | 12/1955 | Ballantyne et al. ---- | 158—36.4 |
| 3,078,699 | 2/1963 | Williams ---------- | 60—39.28 |

JULIUS E. WEST, *Primary Examiner.*